US012709983B2

(12) United States Patent
Savaria et al.

(10) Patent No.: US 12,709,983 B2
(45) Date of Patent: Aug. 18, 2026

(54) FRETTING RESISTANT ROTARY ENGINE HOUSINGS

(71) Applicant: Pratt & Whitney Canada Corp., Longueuil (CA)

(72) Inventors: Vincent Savaria, Laval (CA); Jean-Philippe Simoneau, Saint-Constant (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/952,066

(22) Filed: Nov. 19, 2024

(65) Prior Publication Data

US 2025/0075622 A1 Mar. 6, 2025

Related U.S. Application Data

(62) Division of application No. 18/354,077, filed on Jul. 18, 2023, now Pat. No. 12,152,490.

(51) Int. Cl.

*F01C 1/22* (2006.01)
*F01C 19/00* (2006.01)

(Continued)

(52) U.S. Cl.

CPC .............. *F01C 1/22* (2013.01); *F01C 19/005* (2013.01); *F01C 21/10* (2013.01); *F02B 55/08* (2013.01);

(Continued)

(58) Field of Classification Search

CPC .......... F01C 1/22; F01C 19/005; F01C 21/10; F01C 21/108; F02B 55/08;

(Continued)

(56) References Cited

U.S. PATENT DOCUMENTS

| | | | | |
|---|---|---|---|---|
| 3,155,313 | A | 11/1964 | Bentele | |
| 3,173,406 | A * | 3/1965 | Campos | F02B 53/00 418/57 |

(Continued)

FOREIGN PATENT DOCUMENTS

| | | | |
|---|---|---|---|
| CA | 3153194 | A1 | 9/2022 |
| EP | 1927670 | A1 | 6/2008 |

OTHER PUBLICATIONS

Extended European Search Report for European Application No. 24188824.7 mailed Dec. 9, 2024.

(Continued)

*Primary Examiner* — Jesse S Bogue

(74) *Attorney, Agent, or Firm* — Carlson, Gaskey & Olds, P.C.

(57) ABSTRACT

A rotary internal combustion engine includes a main rotor housing that has a peripheral wall that circumscribes a rotor cavity, a first interface surface and a second interface surface. A rotor is disposed within the rotor cavity. First and second side housings are secured against corresponding first and interface surfaces of the main rotor housing. The main rotor housing, the first side housing and the second side housing are formed from an aluminum alloy and at least one of the first interface surface and the second interface surface include an anti-fretting coating.

20 Claims, 9 Drawing Sheets

(51) Int. Cl.
*F01C 21/10* (2006.01)
*F02B 55/08* (2006.01)
*F02B 53/00* (2006.01)

(52) U.S. Cl.
CPC ..... *F02B 2053/005* (2013.01); *F05C 2253/12* (2013.01)

(58) Field of Classification Search
CPC ............ F02B 2053/005; F05C 2253/12; F05C 2201/021; F05C 2201/903; F04C 2230/91; F04C 2240/30
See application file for complete search history.

(56) References Cited

U.S. PATENT DOCUMENTS 3,359,953 A * 12/1967 Groth ...................... F02B 53/00 418/179
3,791,781 A * 2/1974 Fujiyama ................ F02B 53/00 418/179
3,833,321 A 9/1974 Telang et al.
3,860,367 A 1/1975 Telang et al.
3,890,069 A 6/1975 Telang et al.
3,910,734 A 10/1975 Telang
3,918,137 A * 11/1975 Telang .................. F01C 21/104 29/527.3
3,926,539 A 12/1975 Lamm
3,948,309 A 4/1976 Cordone et al.
4,192,634 A * 3/1980 Campos .................. F02B 53/04 418/91
5,911,809 A * 6/1999 Cordy ................. F04B 27/0873 148/273
10,072,566 B2 9/2018 Villeneuve et al.
11,333,068 B1 * 5/2022 Savaria ..................... F01C 1/22
11,613,995 B2 3/2023 Gagnon-Martin et al.
12,152,490 B1 * 11/2024 Savaria ................... F01C 21/10
2007/0099027 A1 5/2007 Krishnamurthy et al.
2015/0292101 A1 * 10/2015 Gollasch ................ C25D 11/04 205/324
2020/0200009 A1 6/2020 Gagnon-Martin et al.
2022/0280998 A1 9/2022 Mathew et al.

OTHER PUBLICATIONS

Neale, Michael J., “The Tribology Handbook (Second Edition)”, Referex, XP040425270, ISBN:0 7506 1198 7.

* cited by examiner

FRETTING RESISTANT ROTARY ENGINE HOUSINGS

CROSS-REFERENCE TO RELATED APPLICATION

This application is a Divisional of U.S. patent application Ser. No. 18/354,077 filed Jul. 18, 2023.

TECHNICAL FIELD

The present disclosure relates generally to rotary engine and more specifically to application of fretting prevention coatings between components of a rotary engine.

BACKGROUND

A rotary engine is an internal combustion engine with one or more rotating pistons. A piston rotates within a combustion chamber defined within a housing that includes features for supplying coolant flow along with the required air/fuel mixture and lubricant. The combustion chamber is defined between two end walls that are exposed to high temperatures and pressures. The high temperatures and pressures can present challenges to operational longevity and performance.

Engine manufacturers continue to seek further improvements to engine performance including improvements to thermal, transfer and propulsive efficiencies.

SUMMARY

A rotary internal combustion engine according to a disclosed example embodiment includes, among other possible things, a main rotor housing that has a peripheral wall that circumscribes a rotor cavity, a first interface surface and a second interface surface. A rotor is disposed within the rotor cavity. A first side housing is secured against the first interface surface of the rotor housing and a second side housing is secured against the second interface surface of the rotor housing, the main rotor housing, the first side housing and the second side housing are formed from an aluminum alloy and at least one of the first interface surface and the second interface surface include an anti-fretting coating. A first side plate is partially disposed within a clearance space between the first side housing and the main housing and a second side plate is partially within a clearance space that is disposed between the second side housing and the main housing. Each of the first side plate and the second side plate define a running surface for the rotor.

A rotary internal combustion engine according to another disclosed example embodiment includes, among other possible things, a main rotor housing that has a peripheral wall that circumscribes a rotor cavity, a first interface surface and a second interface surface. A rotor is disposed within the rotor cavity. A first side housing is secured against the first interface surface of the rotor housing. A second side housing is secured against the second interface surface of the rotor housing, the main rotor housing, the first side housing and the second side housing are formed from an aluminum alloy and at least one of the first interface surface and the second interface surface include an anti-fretting coating that has chromium carbide. A first side plate is partially disposed within a clearance space between the first side housing and the main housing. A second side plate is partially within a clearance space that is disposed between the second side housing and the main housing. Each of the first side plate and the second side plate define a running surface for the rotor, each of the first side housing and the second side housing include a plate support surface and an inner peripheral shoulder that have a peripheral surface that abuts a corresponding one of the first side plate and the second side plate and both the plate support surface and the peripheral surface include the anti-fretting coating.

A method of assembling a rotary internal combustion engine according to another disclosed example embodiment includes, among other possible things, forming at least a main rotor housing, a first side housing and a second side housing from an aluminum alloy. A first side plate and a second side plate are formed. Interface surfaces are selected between at least the main rotor housing, the first side housing, the second side housing, the first side plate and the second side plate. Non-selected surface of the each of the at least the main rotor housing, the first side housing, the second side housing, the first side plate and the second side plate are masked. An anti-fretting coating is applied to the selected interface surfaces.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
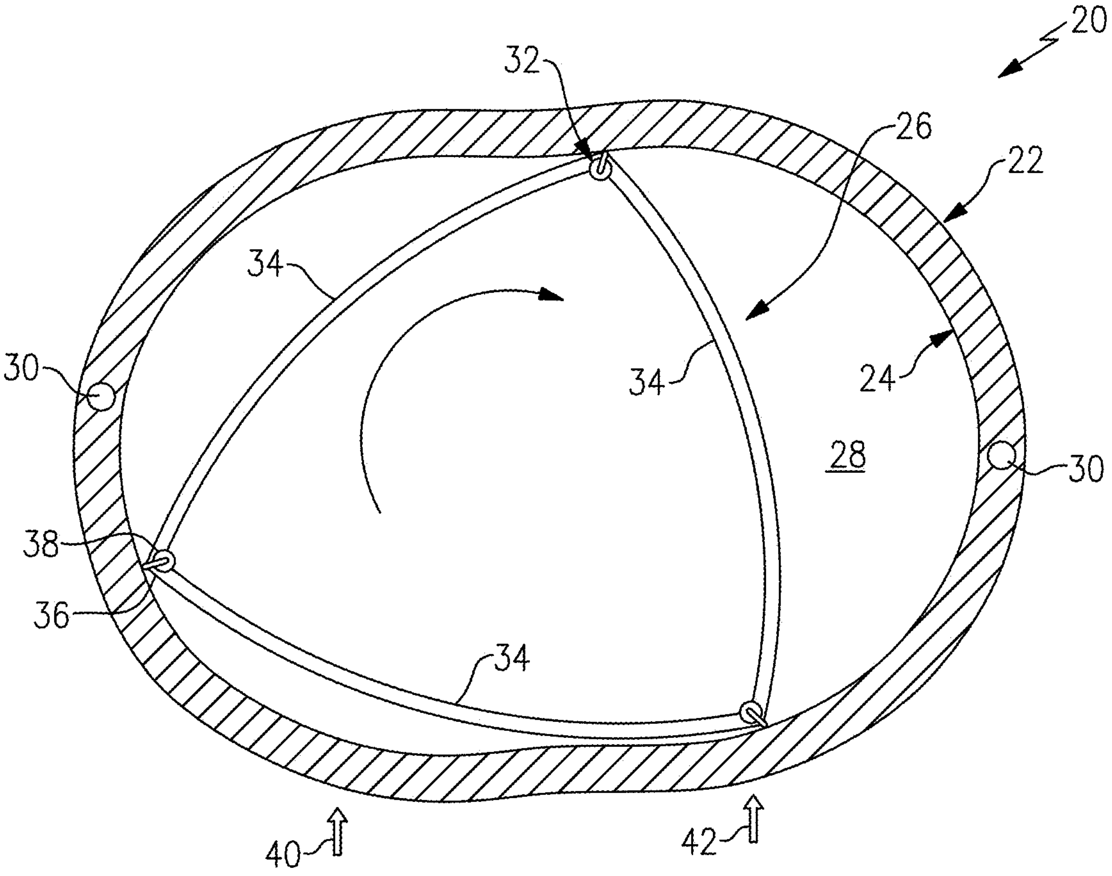
FIG. 1 is a schematic cross-sectional view of an example rotary engine embodiment.
Figure 2:
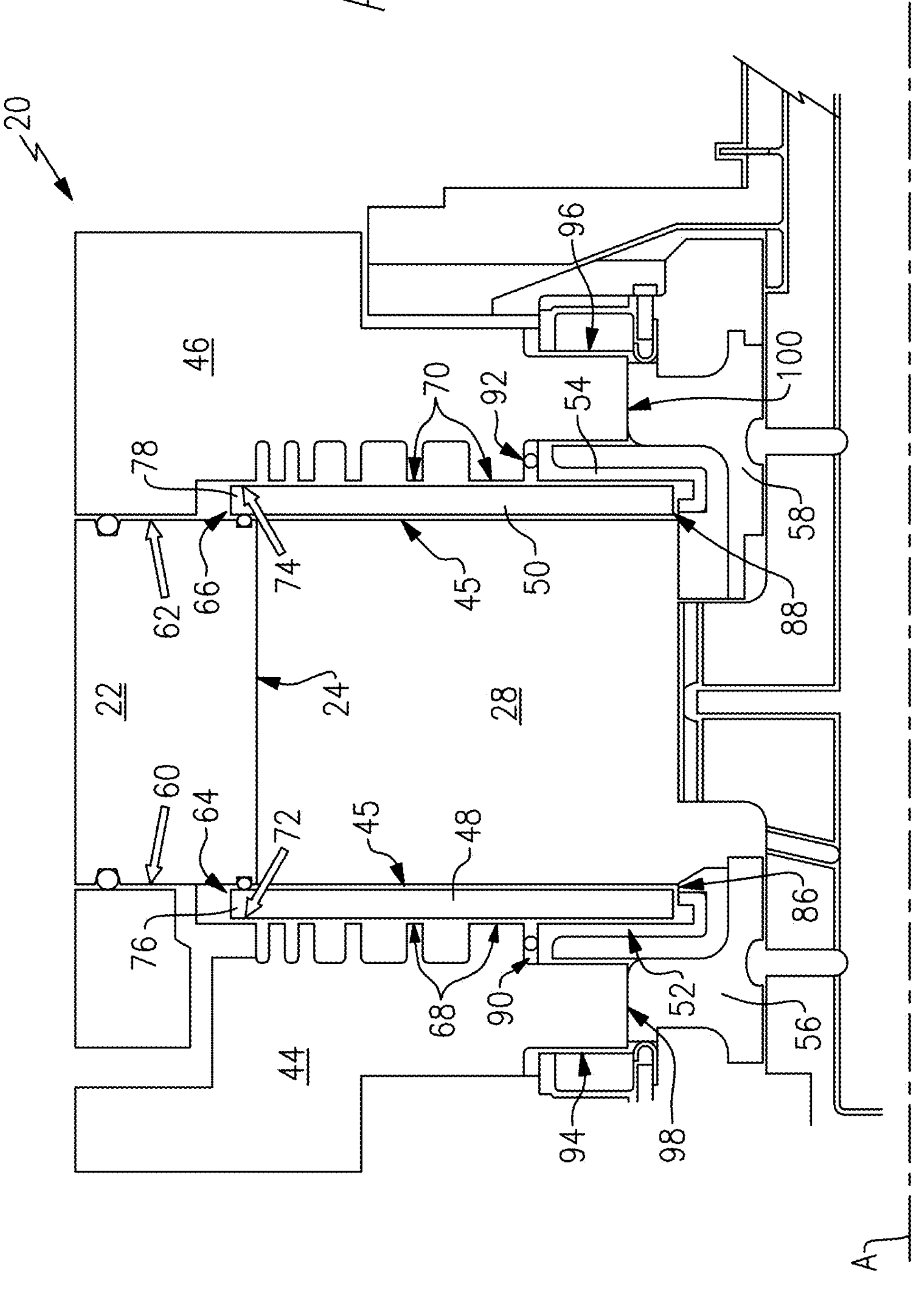
FIG. 2 is cross-sectional view of a portion of the example rotary engine embodiment.

Referring to FIGS. 1 and 2, a rotary internal combustion engine is schematically shown and indicated at 20. The example engine 20 includes an anti-fretting coating on select interface surfaces of aluminum alloy housing components to increase durability and long term wear resistance.

The example rotary internal combustion engine 20 is commonly referred to as a Wankel engine and includes a rotor 26 that rotates within a rotor cavity 28 defined by a peripheral wall 24 of a main rotor housing 22. The rotor 26 oscillates about an engine central axis A. Coolant passages 30 are defined within the peripheral wall 24 for circulation of a cooling flow. An inlet 40 and exhaust 42 are indicated schematically and provide communication of fuel and exhaust gases with the rotor cavity 28.

The rotor 26 includes sides 34 that extend between three apex portions 32. An end seal 38 and apex seal 36 are disposed at each of the apex portions 32. The apex seal 36 provides for sealing against the peripheral wall 24 and the end seal 38 provides for sealing against a seal running surface 45 on each of a first side plate 48 and a second side plate 50 (FIG. 2). In one example embodiment, the first side plate 48 and the second side plate 50 are formed from a silicon carbide material. In another example embodiment, the first side plate 48 and the second side plate 50 are formed from an aluminum material. The side plates 48, 50 may be formed from other materials and alloys within the scope and contemplation of this disclosure. Moreover, the application of the anti-fretting coating may enable the use of other materials for the side plates. 48 50.

A first side housing 44 is attached at a first interface 60 to a first side of the main rotor housing 22. A second side housing 46 is attached at a second interface to a second side of the main rotor housing 22. The first side plate 48 includes an edge 76 that is disposed within a first clearance space 64 between an inner edge 72 of the first side housing 44 and the main housing 22. The second side plate 50 includes an edge 78 that is disposed within a clearance space 66 between the main housing 22 and an inner edge 74 of the second side housing 46. The first and second side plates 48, 50 are supported over the rotor cavity 28 such that rotor 26 is mounted with an axial clearance between side plates 48 and 50. The side plates 48, 50 are further supported at corresponding first and second interfaces 68, 70.

The first and second side plates 48, 50 are further supported at a radially inner portion by a corresponding one of a first transfer housing 52 and a second transfer housing 54. The first and second transfer housings 52, 54 are fabricated from aluminum and mate to a corresponding one of the first and second side housings 44, 46 by way of a radial fit. The first transfer housing 52 mates to the first side housing 44 at a radially inner interface 90. The second transfer housing 54 mates to the second side housing 44 at a radially inner interface 92.

A first main bearing support 56 is in contact with the first housing 44 at a radial interface 98 and an axial interface 94. A second main bearing support 58 is in contact with the second side housing 46 at a radial interface 100 and an axial interface 96. In one disclosed example, the first main bearing support 56 and the second bearing support 52 are steel parts.

Select interfaces between the components are treated with an anti-fretting coating. The anti-fretting coating is applied to component interfaces and provide increased wear resistance.

Figure 3:
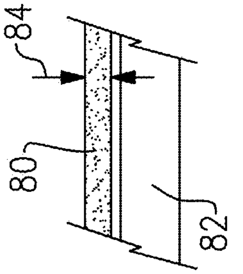
FIG. 3 is a cross-sectional view of an example anti-fretting coating applied to an example aluminum component.

Referring to FIG. 3 with continued reference to FIG. 2, an example surface 82 is shown with an anti-fretting coating 80. The anti-fretting coating 80 is applied to a thickness 84. The thickness 84 is determined to provide the desired increases in wear resistances and durability without interfering with component assembly and fitment. The specific material composition of the anti-fretting coating may vary depending on the location and is tailored to provide wear resistance for that location. In one example embodiment, the anti-fretting coating comprises an aluminum bronze thermal spray. In another example embodiment, the anti-fretting coating includes chromium carbide or tungsten carbide. The anti-fretting coating may be machined to a final desired thickness and may be applied to the thickness 84 that corresponds with capabilities of a specific coating process.

Additionally, the example anti-fretting coating is selected from material that is compatible with strains encountered at each interface. Accordingly, the composition of the anti-fretting coating is selected, at least partially, based on a ductility in view of the local strain at any interface. Additionally, the example anti-fretting coating 80 is applied as a single-layer coating. However, a multi-layer coating could also be used and is within the contemplation and scope of this disclosure.

Figure 4:
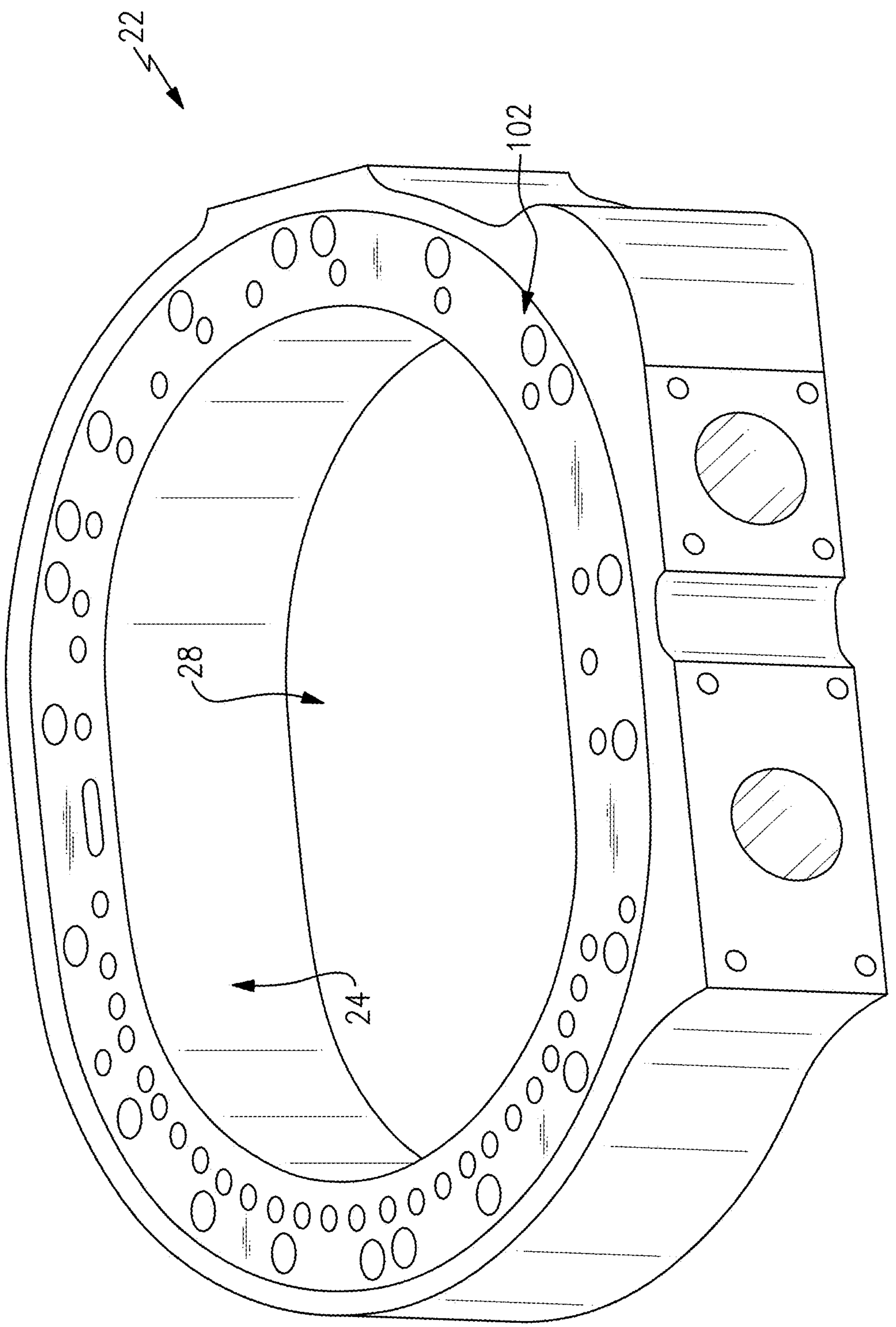
FIG. 4 is a perspective view of an example main rotor housing embodiment.
Figure 5:
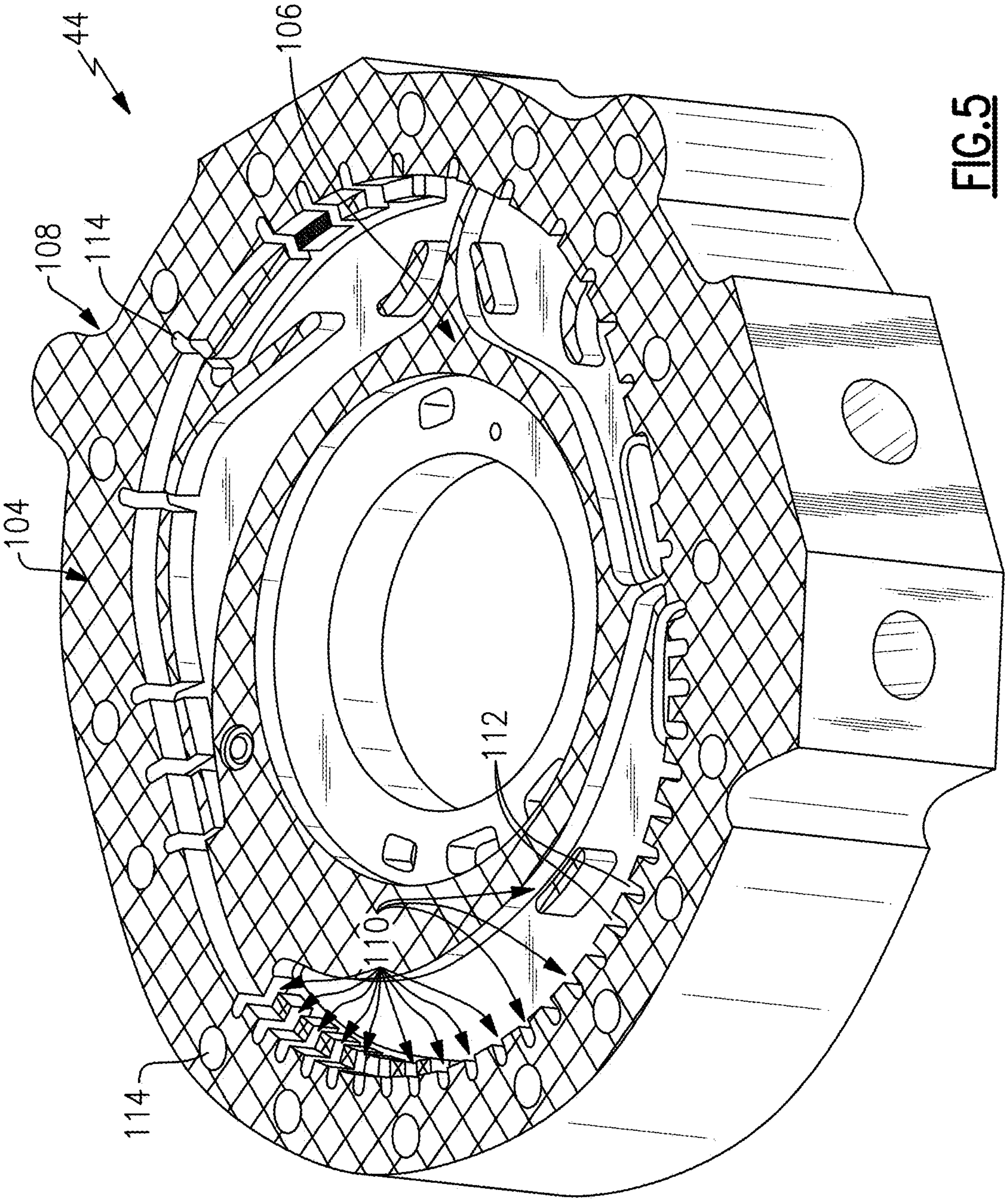
FIG. 5 is a perspective view of an example side housing embodiment.

Referring to FIGS. 4 and 5, with continued reference to FIG. 2, the main rotor housing 22 includes surface 102 of the interface 60 with the first side housing 44. The first side housing 44 is shown by way of example and the similar configuration is provided between the main housing 22 and the second side housing at the interface 62.

The interface 60 is between the surface 102 of the main housing 22 and the surface 104 of the first side housing 44. Either or both surfaces 102 and 104 may be coated with an anti-fretting coating. In one example embodiment, the cross-hatched surfaces of the side housing 44 are coated with an anti-fretting coating indicated at 108.

Figure 6:
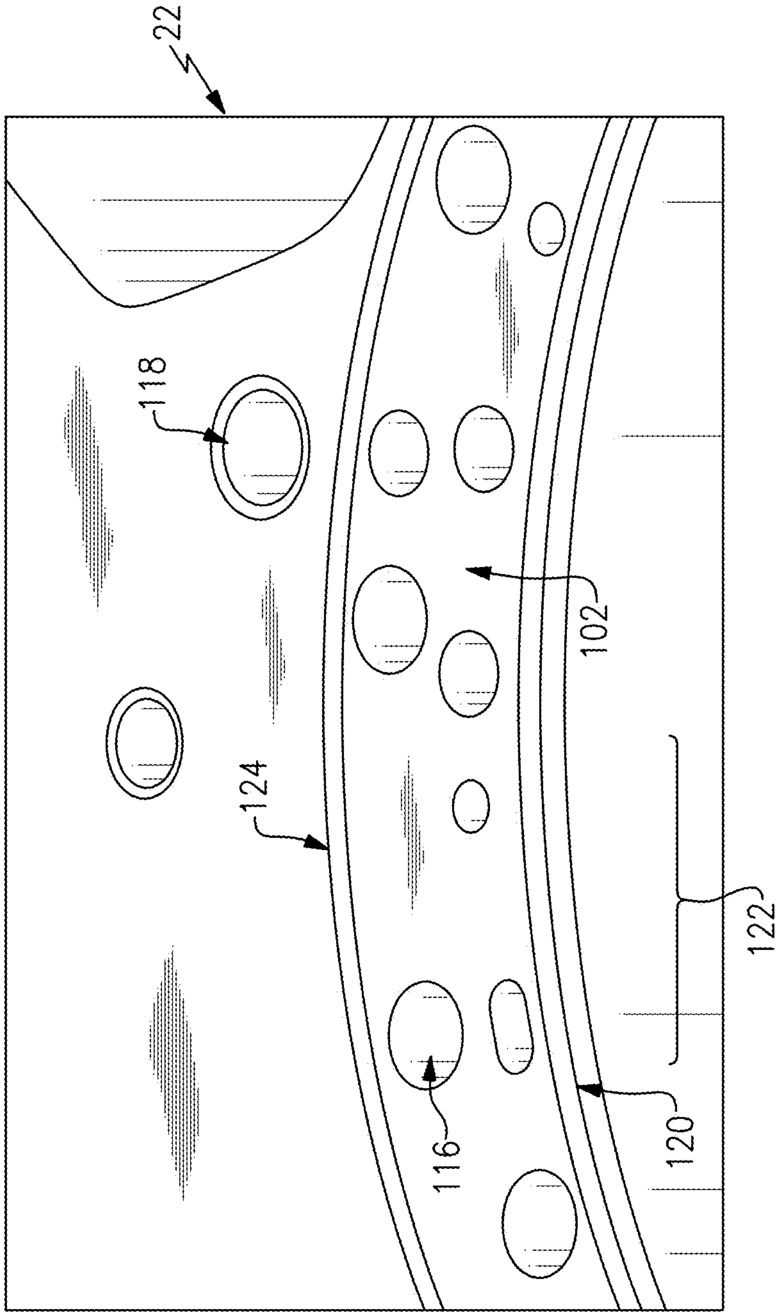
FIG. 6 is an enlarged perspective view of a portion of the main rotor housing.

Referring to FIG. 6 with continued reference to FIG. 4, a portion of the main rotor housing 22 is shown and includes the surface 102 of the first interface 60. The main rotor housing 22 includes dowel holes 118, fastener holes 116 and other holes for cooling. A seal groove 120 is disposed at an inner portion and an outer seal groove 124. The seal groove provides a location for an O-ring or other seal assembly. The seal groove 120 may be masked to prevent coating deposition in this area. The dowel holes 118 are masked to prevent impingement of anti-fretting coating. The dowel holes 118 are held to a tight tolerance and therefore are masked to block errant application of the anti-fretting coating. Moreover, the seal groove 124 may also be masked to prevent disruption of the sealing functions. The fastener holes 116 may be permitted to include overspray of the anti-fretting coating as any such coating would have negligible effect on cooling flow. Moreover, an interior surface indicated at 122 may be allowed to be open to overspray of the anti-fretting coating if a final machining operation of the coating is utilized after application of the coating. Accordingly, no residual coating or overspray is left on the completed part, but is allowed prior to finish machining operations that would remove such residual coating.

Figure 7:
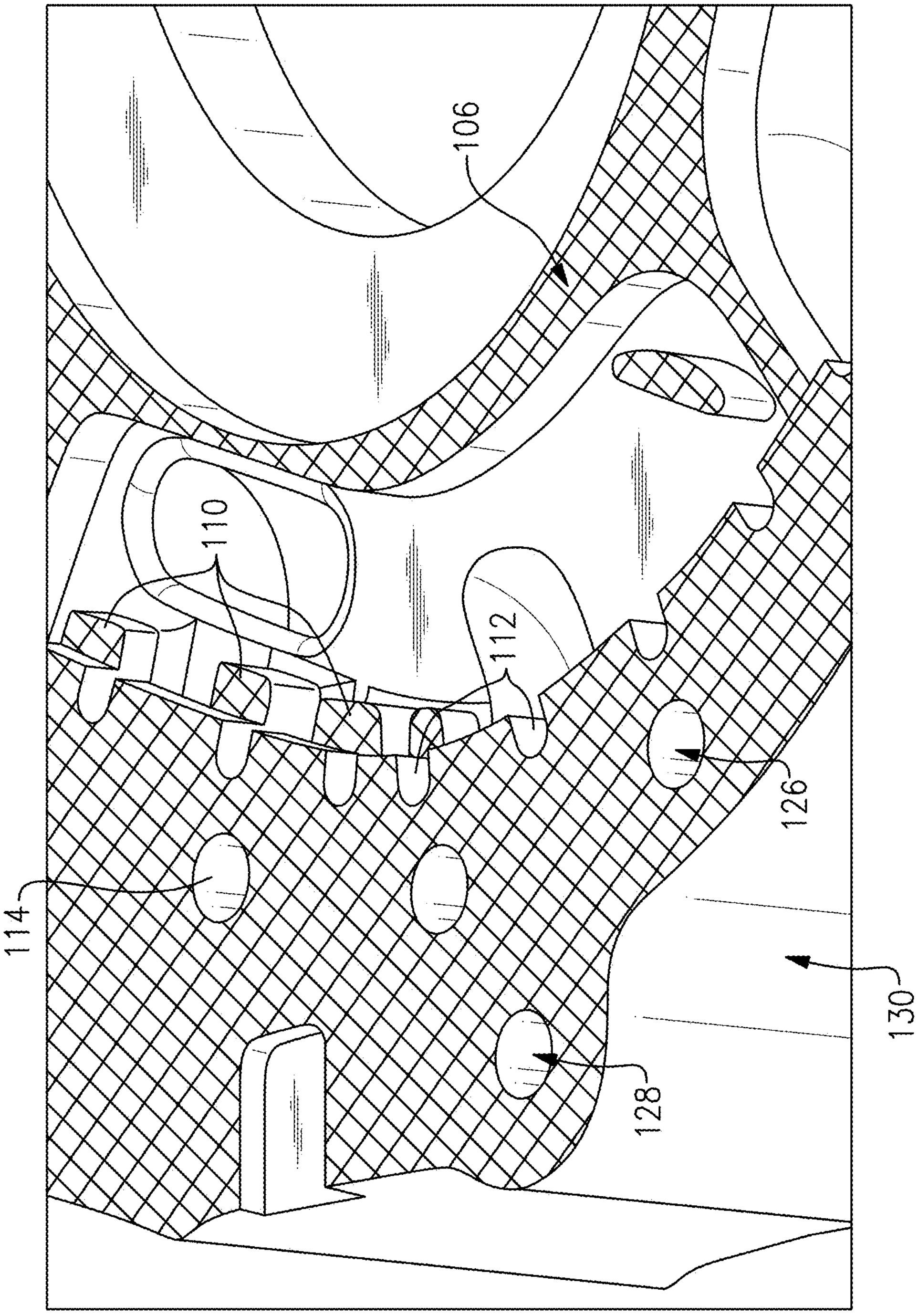
FIG. 7 is enlarged perspective view of a portion of an example side housing.

Referring to FIG. 7, with continued reference to FIG. 5, a portion of the side housing 44 is shown and includes a plate support surface 106 is stepped down from the surface 104 of the side housing 44. Each of the first side housing 44 and the second side housing 44 include a plate support surface 106 that abuts a corresponding one of the first side plate 48 and the second side plate 50. The plate support surface 106 includes an anti-fretting coating. The plate support surface 106 abuts the first side plate 48 and includes an anti-fretting coating indicated by the cross-hatching 108. It should be appreciated that corresponding support surfaces are present in the second side housing 46 and would be similarly coated.

The support surface 106 is interrupted at portions 110 by a plurality of channels 112. The portions 110 are coated along with the support surface 106 to increase wear resistance at the interface with the side plate 48.

A dowel hole 128 is masked to prevent overspray impingement and to maintain the desired dimensions. Holes 114, 126 for tie bolts and channels 112 may be allowed to have some overspray of the anti-fretting coating. An exterior surface 130 may also be permitted to accumulate some overspray. The surfaces that can tolerate overspray of the anti-fretting coating are not masked to simplify application of the anti-fretting coating.

The application of the anti-fretting coating may be completed before any final contour machining of all these channels 112 to simplify the coating process and avoid complex masking. For example, a simple pocket having the depth of the side plate back support face could be machined in the semi-finish side housing, then the coating would be applied and final machined to produce all the support face contours and improve the surface finish and flatness of the coating surface on the remaining coated surfaces.

Figure 8:
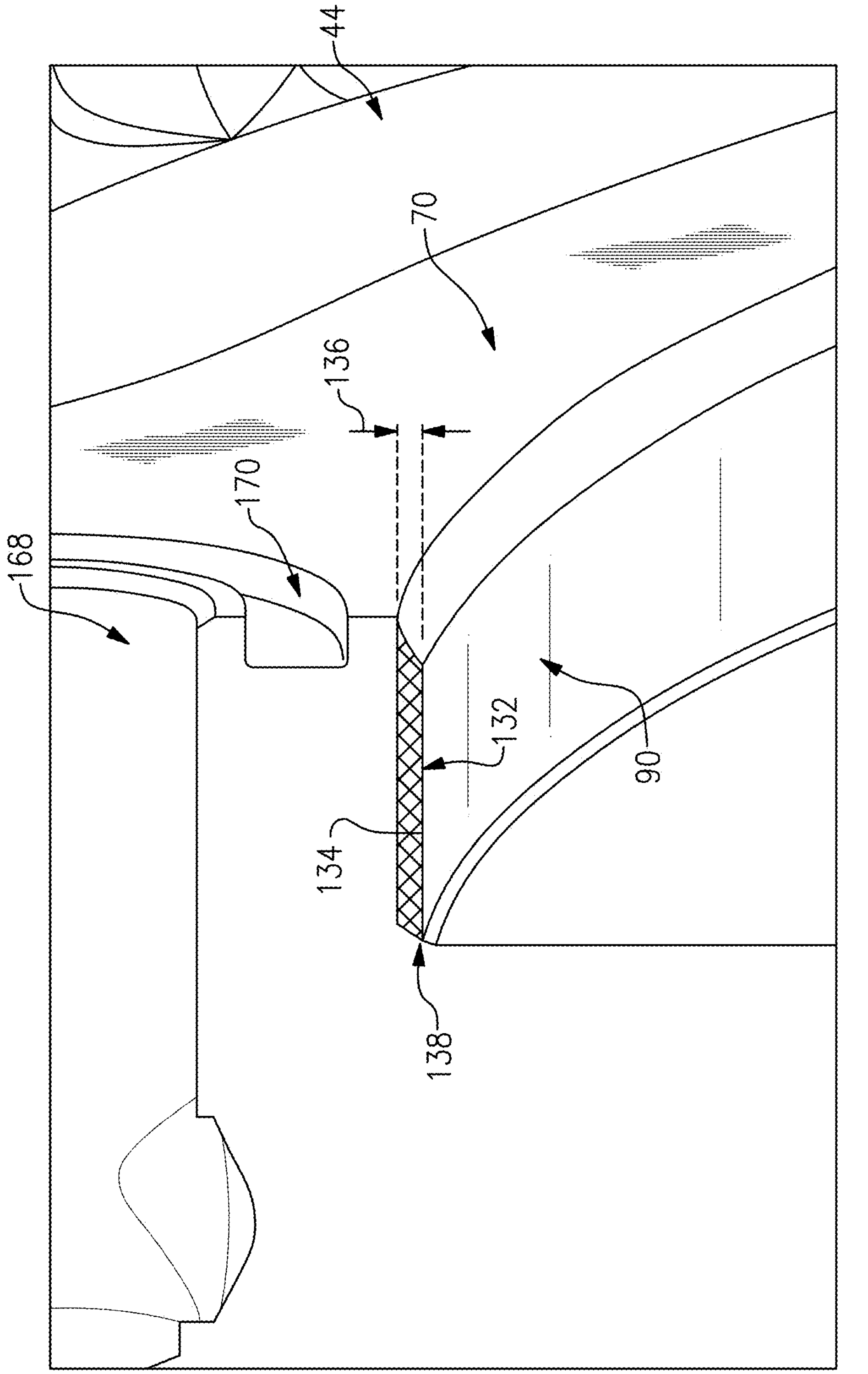
FIG. 8 is sectional view of a portion of an example side housing.

Referring to FIG. 8, the side housing 44 portion of the interface 90 is shown and includes an inner radial face surface 132 that has an anti-fretting coating 134 deposited within a recess 136. The inner radial face surface 132 of each of the first side housing 44 and the second side housing 46 is recessed to accommodate a thickness of the anti-fretting coating. The anti-fretting coating 134 is applied inside the recess 136 in the bore surface 132 that is pre-machined in the side housing 44. A transition chamfer or radius 138 may be formed after application of the anti-fretting coating 134. An adjacent axial face is the interface 70 between the side housing 44 and the seal plate 48. A blow-by-hole 168 and a seal groove 170 are shown and are masked to prevent built up of any coating in the indicated areas.

Figure 9:
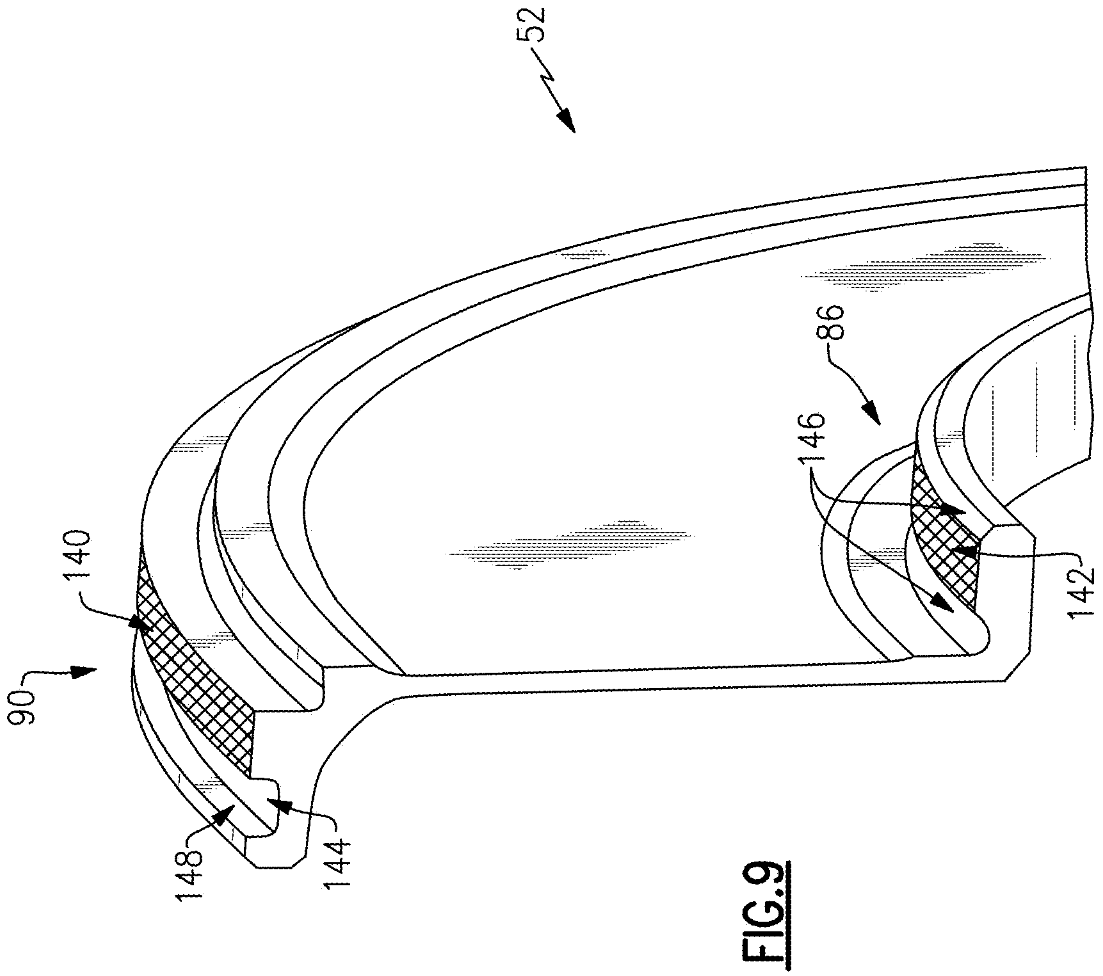
FIG. 9 is a sectional view of a portion of an example transfer housing embodiment.

Referring to FIG. 9 with continued reference to FIG. 2, the first transfer housing 52 is shown in cross-section and includes coated surface 140 of the interface 90 (FIG. 2). The first transfer housing 52 further includes coated surface 142 of the interface 86. Both the first transfer housing 52, shown in FIG. 9 and the second transfer housing 54 include the radially outer surface 140 abutting a corresponding radial face surface 132 (FIG. 8) of the corresponding one of the first side housing 44 and the second side housing 46. The radial face surface 140 includes the anti-fretting coating.

Each of the first transfer housing 52 and the second transfer housing 54 includes a radially inner surface 142 abutting a radially inner surface 86, 88 (FIG. 2) of a corresponding one of the first side plate 48 and the second side plate 50.

The radially inner surface 142 is coated with anti-fretting coating and is disposed between chamfers 146. The transfer housing 52 is made of aluminum alloy and the coating is applied to protect the aluminum of both the side housing 44 and the transfer housing 52. At the interface 86, the anti-fretting coating 146 is applied to prevent direct contact between the aluminum alloy of the transfer housing 52 and side plate 48 and therefore protect both parts. Overspray may be permitted on the adjacent chamfers 146 disposed on either side of the radially inner surface 142. A seal groove 148 incudes an inner side 144 that may have overspray. Overspray on the inner side 144 of the seal groove may be allowed because the remainder of the seal groove 148 remains clear of overspray.

Figure 10:
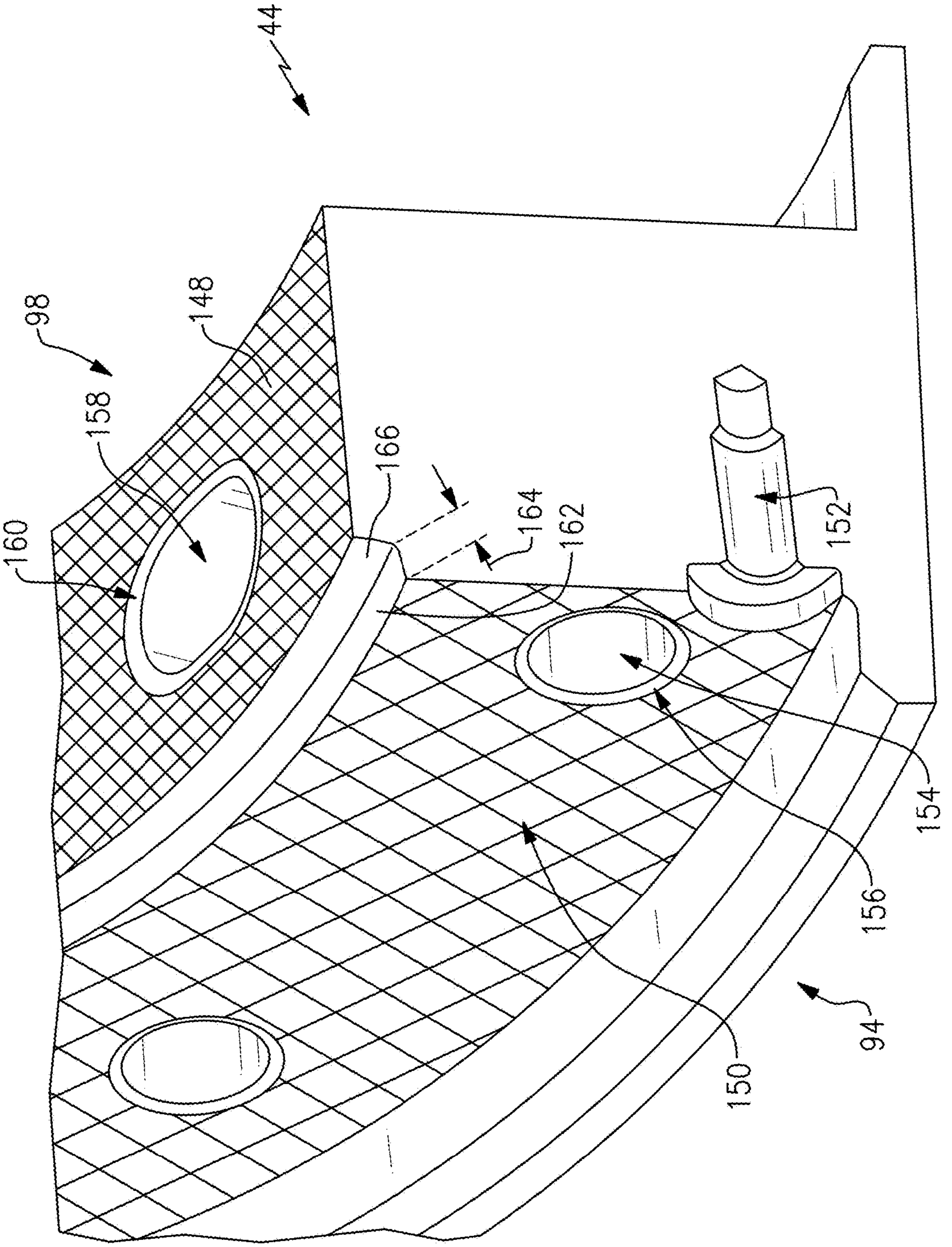
FIG. 10 is a sectional view of a portion of an example bearing support area of the side housing.

Referring to FIG. 10, a portion of the first side housing 44 that abuts against the first main bearing support 56 (FIG. 1). The first main bearing support 56 is a steel part and therefore a coating is applied to portions of the side housing 44 in contact with the steel main bearing support. The side housing 44 engages the steel main bearing support 56 at the interfaces 98 and 94. The harder and more wear resistant steel of the main bearing support 56 will tend to wear the aluminum side housing 44. Accordingly, coated surfaces 148 and 150 of respective interfaces 98 and 94 provide a protective layer to prevent and reduce damage of the aluminum side housing 44. The bore of the side housing 44 includes a seal groove 162 that is masked within the spacing indicated at 164.

A chamfer 166 leading into the seal groove 162 may be permitted some overspray. The overspray on the chamfer 166 may be smoothed to case the transition into the seal groove 162. The inner diameter 154 of an opening is masked to prevent adhesion of overspray. The chamfer 156 leading into the inner diameter 154 of thread hole is not masked to case operation. Similarly, the inner diameter 158 is masked while the chamfer 160 transitioning into the inner diameter 158 is allowed to have some overspray of anti-fretting coating. A shoulder pin hole 152 is masked to prevent anti-fretting coating from changing a defined fit between a shoulder pin (not shown) and the hole 152. Although the portion of the first side housing 44 that engages the first bearing support 56 is shown and describe by way of example, the second side housing 46 would include the same or similar surfaces that are engaged to the second main bearing support 58 (FIG. 1).

Although the example anti-fretting coating is described and disclosed by example as being a compound applied in a thermal spray process, other coating application processes could be utilized and are within the contemplation of this disclosure.

For example, a hard anodizing treatment could be utilized and applied to both the side housings 44, 46 and the main rotor housing 22. All surfaces and locations could be protected in the same operation and may provide reduced costs and manufacturing efforts.

Additionally, a hard carbon coating could be utilized instead of thermal deposition or anodizing. A hydrogen free amorphous carbon coating may be applied to aluminum alloys using a filtered arc technique.

Furthermore, an electro-deposited coating may be applied to protect selected locations. Many alternatives exist such as Ni-based matrix with fine SiC particles, Co-based matrix with chromium carbide particles, Co-P (pure, with chromium carbide or SiC particles). In this process, the part is immerged in an electrolyte bath and an electrical current is circulated between the parts (cathode) and a metalizing source material (anode).

Alternatively, a doped aluminum powder deposition process could be utilized. In such a process, a thin layer of aluminum alloy reinforced with hard particles such as SiC is applied in a process similar to thermal deposition.

Accordingly, the example disclosed housing provides for the localized application of an anti-fretting coating to significantly reduce or eliminate wear and fretting damage at the highly loaded mechanical interfaces of the rotary engine. Such wear is reduced while still providing for use of lightweight aluminum housing designs to meet aerospace demanding power-to-weight ratio targets.

A rotary internal combustion engine according to a disclosed example embodiment includes, among other possible things, a main rotor housing 22 that has a peripheral wall 24 that circumscribes a rotor cavity 28, a first interface surface and a second interface surface. A rotor 26 is disposed within the rotor cavity 28. A first side housing 44 is secured against the first interface surface of the main rotor housing 22. A second side housing 46 is secured against the second interface surface of the main rotor housing 22, the main rotor housing 22, the first side housing 44 and the second side housing 46 are formed from an aluminum alloy and at least one of the first interface surface and the second interface surface include an anti-fretting coating. A first side plate 48 is partially disposed within a clearance space 64,66 between the first side housing 44 and the main housing. A second side plate 48/50 is partially within a clearance space 64/66 that is disposed between the second side housing 46 and the main housing. Each of the first side plate 48 and the second side plate 48/50 define a running surface 45 for the rotor 26.

In a further embodiment of the foregoing, each of the first side housing 44 and the second side housing 46 include a plate support surface 106 that abuts a corresponding one of the first side plate 48 and the second side plate 48/50 and the plate support surface 106 includes an anti-fretting coating.

In a further embodiment of any of the foregoing, each of the first side housing 44 and the second side housing 46 includes a peripheral surface that abuts a corresponding one of the first side plate 48 and the second side plate 48/50 and the peripheral surface includes an anti-fretting coating.

In a further embodiment of any of the foregoing, the rotary internal combustion engine includes a first transfer housing 52 and a second transfer housing 54 that each includes a radially outer surface 140 that abuts a corresponding inner radial face surface 132 of one of the first side housing 44 and the second side housing 46. The radial face surface 132 includes an anti-fretting coating.

In a further embodiment of any of the foregoing, the radial face surface 132 of each of the first side housing 44 and the second side housing 46 is recessed to accommodate a thickness of the anti-fretting coating.

In a further embodiment of any of the foregoing, each of the first transfer housing 52 and the second transfer housing 54 includes a radially inner surface 142 that abuts a radially inner surface 142 of a corresponding one of the first side plate 48 and the second side plate 48/50 and the radially inner surface 142 includes an anti-fretting coating.

In a further embodiment of any of the foregoing, each of the first transfer housing 52 and the second transfer housing 54 include a seal surface adjacent to the radially inner surface 142 that does not include the anti-fretting coating.

In a further embodiment of any of the foregoing, the rotary internal combustion engine further includes a first bearing support 56 and a second bearing support 52 that abut against an inner bore surface of a corresponding one of the first side housing 44 and the second side housing 46. The inner bore surface of each of the first side housing 44 and the second side housing 46 includes an anti-fretting coating.

In a further embodiment of any of the foregoing, the anti-fretting coating includes a thermal spray coating that contains at least one of a chromium carbide, aluminum bronze, or tungsten carbide.

In a further embodiment of any of the foregoing, the anti-fretting coating includes one of an anodizing coating, a hard carbon coating, an electro-deposition coating or an aluminum powder coating.

In a further embodiment of any of the foregoing, the anti-fretting coating is machined to a desired thickness.

A rotary internal combustion engine according to another disclosed example embodiment includes, among other possible things, a main rotor housing 22 that has a peripheral wall 24 that circumscribes a rotor cavity 28, a first interface surface and a second interface surface. A rotor 26 is disposed within the rotor cavity 28. A first side housing 44 is secured against the first interface surface of the main rotor housing 22. A second side housing 46 is secured against the second interface surface of the main rotor housing 22, the main rotor housing 22, the first side housing 44 and the second side housing 46 are formed from an aluminum alloy and at least one of the first interface surface and the second interface surface include an anti-fretting coating that has chromium carbide. A first side plate 48 is partially disposed within a clearance space 64/66 between the first side housing 44 and the main housing. A second side plate 48/50 is partially within a clearance space 64/66 that is disposed between the second side housing 46 and the main housing. Each of the first side plate 48 and the second side plate 48/50 define a running surface 45 for the rotor 26, each of the first side housing 44 and the second side housing 46 include a plate support surface 106 and an inner peripheral shoulder that have a peripheral surface that abuts a corresponding one of the first side plate 48 and the second side plate 48/50 and both the plate support surface 106 and the peripheral surface include the anti-fretting coating.

In a further embodiment of the foregoing, the rotary internal combustion engine includes a first transfer housing 52 and a second transfer housing 54 that each includes a radially outer surface 140 that abuts a corresponding radial face surface 132 of one of the first side housing 44 and the second side housing 46 and a radially inner surface 142 that abuts a radially inner surface 142 of a corresponding one of the first side plate 48 and the second side plate 48/50. Both the radially outer surface 140 and the radial face surface 132 include the anti-fretting coating.

In a further embodiment of any of the foregoing, the rotary internal combustion engine further includes a first bearing support 56 and a second bearing support 52 that abut against an inner bore surface of a corresponding one of the first side housing 44 and the second side housing 46. The inner bore surface of at least one of the first side housing 44 and the second side housing 46 includes an anti-fretting coating.

A method of assembling a rotary internal combustion engine according to another disclosed example embodiment includes, among other possible things, forming at least a main rotor housing 22, a first side housing 44 and a second side housing 46 from an aluminum alloy. A first side plate 48 and a second side plate 48/50 are formed. Interface surfaces are selected between at least the main rotor housing 22, the first side housing 44, the second side housing 46, the first side plate 48 and the second side plate 48/50. Non-selected surface of the each of the at least the main rotor housing 22, the first side housing 44, the second side housing 46, the first side plate 48 and the second side plate 48/50 are masked. An anti-fretting coating is applied to the selected interface surfaces.

In a further embodiment of the foregoing, the method further includes forming a recess 136 on at least one of the selected interface surfaces prior to application of the anti-fretting coating. The recess 136 is formed to correspond with a final thickness of the anti-fretting coating.

In a further embodiment of any of the foregoing, the method further includes applying the anti-fretting coating to first thickness and machining the anti-fretting coating to a second thickness that is less than the first thickness.

In a further embodiment of any of the foregoing, the method further includes selecting a radially outer surface 140 on each of a first transfer housing 52 and a second transfer housing 54 that abuts a corresponding radial face surface 132 of one of the first side housing 44 and the second side housing 46 and applying the anti-fretting coating to the radially outer surface 140.

In a further embodiment of any of the foregoing, each of the first transfer housing 52 and the second transfer housing 54 include a seal surface adjacent to the radially inner surface 142 and the method includes the step of masking the seal surface.

In a further embodiment of any of the foregoing, the anti-fretting coating includes one of a chromium carbide, an aluminum bronze, or a tungsten carbide.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of assembling a rotary internal combustion engine comprising:

forming at least a main rotor housing, a first side housing and a second side housing from an aluminum alloy;

forming a first side plate and a second side plate;

selecting interface surfaces between at least the main rotor housing, the first side housing, the second side housing, the first side plate and the second side plate;

masking non-selected surface of the each of the at least the main rotor housing, the first side housing, the second side housing, the first side plate and the second side plate; and applying an anti-fretting coating to the selected interface surfaces, wherein the rotary internal combustion engine further comprises a first bearing support and a second bearing support that abut against an inner bore surface of a corresponding one of the first side housing and the second side housing, and the method further comprises applying an anti-fretting coating to the inner bore surface of each of the first side housing and the second side housing.

2. The method as recited in claim 1, further comprising forming a recess on at least one of the selected interface surfaces prior to application of the anti-fretting coating, wherein the recess is formed to correspond with a final thickness of the anti-fretting coating.

3. The method as recited in claim 1, further comprising applying the anti-fretting coating to first thickness and machining the anti-fretting coating to a second thickness that is less than the first thickness.

4. The method as recited in claim 1, further comprising selecting a radially outer surface on each of a first transfer housing and a second transfer housing that abuts a corresponding radial face surface of one of the first side housing and the second side housing and applying the anti-fretting coating to the radially outer surface.

5. The method as recited in claim 4, wherein each of the first transfer housing and the second transfer housing include a seal surface adjacent to a radially inner surface and the method includes the step of masking the seal surface.

6. The method as recited in claim 1, wherein the anti-fretting coating comprises one of a chromium carbide, an aluminum bronze, or a tungsten carbide.

7. A method of configuring a rotary internal combustion engine comprising:

configuring a main rotor housing to have a peripheral wall circumscribing a rotor cavity, a first interface surface and a second interface surface;

configuring a rotor for operation within the rotor cavity;

configuring a first side housing for securement against the first interface surface of the main rotor housing;

configuring a second side housing for securement against the second interface surface of the main rotor housing, wherein the main rotor housing, the first side housing and the second side housing are formed from an aluminum alloy and at least one of the first interface surface and the second interface surface are configured to includes an anti-fretting coating;

configuring a first side plate to be partially disposed within a clearance space between the first side housing and the main rotor housing;

configuring a second side plate to be partially disposed within a clearance space disposed between the second side housing and the main rotor housing, wherein each of the first side plate and the second side plate are further configured to define a running surface for the rotor; and configuring a first transfer housing and a second transfer housing to each include a radially outer surface abutting a corresponding inner radial face surface of one of the first side housing and the second side housing; and configuring each of the corresponding inner face surfaces of the first side housing and the second side housing to receive an anti-fretting coating.

8. The method of configuring a rotary internal combustion engine as recited in claim 7, further comprising configuring each of the first side housing and the second side housing to include a plate support surface that abuts a corresponding one of the first side plate and the second side plate and configuring each plate support surface to receive an anti-fretting coating.

9. The method of configuring a rotary internal combustion engine in claim 8, further comprising configuring of each of the first side housing and the second side housing to include a peripheral surface abutting a corresponding one of the first side plate and the second side plate and configuring the peripheral surface to include an anti-fretting coating.

10. The method of configuring a rotary internal combustion engine as recited in claim 9, further comprising configuring the radial face surface of each of the first side housing and the second side housing to be recessed to accommodate a thickness of the anti-fretting coating.

11. The method of configuring a rotary internal combustion engine as recited in claim 10, further comprising configuring each of the first transfer housing and the second transfer housing to include a seal surface adjacent to the radially inner surface that does not include the anti-fretting coating.

12. The method of configuring a rotary internal combustion engine as recited in claim 7, further comprising configuring a first bearing support and a second bearing support to abut against an inner bore surface of a corresponding one of the first side housing and the second side housing and configuring the inner bore surface of each of the first side housing and the second side housing to include an anti-fretting coating.

13. The method of configuring a rotary internal combustion engine as recited in claim 7, further comprising configuring the anti-fretting coating as a thermal spray coating containing at least one of a chromium carbide, aluminum bronze, or tungsten carbide.

14. The method of configuring a rotary internal combustion engine a recited in claim 7, further comprising configuring the anti-fretting coating as one of an anodizing coating, a hard carbon coating, an electro-deposition coating or an aluminum powder coating.

15. The method of configuring a rotary internal combustion engine as recited in claim 7, further comprising configuring the anti-fretting coating to be machined to a desired thickness.

16. A method of assembling a rotary internal combustion engine comprising:

forming at least a main rotor housing, a first side housing and a second side housing from an aluminum alloy;

forming a first side plate and a second side plate;

selecting interface surfaces between at least the main rotor housing, the first side housing, the second side housing, the first side plate and the second side plate;

masking non-selected surface of the each of the at least the main rotor housing, the first side housing, the second side housing, the first side plate and the second side plate;

applying an anti-fretting coating to the selected interface surfaces; and forming a recess on at least one of the selected interface surfaces prior to application of the anti-fretting coating, wherein the recess is formed to correspond with a final thickness of the anti-fretting coating.

17. The method as recited in claim 16, further comprising applying the anti-fretting coating to first thickness and machining the anti-fretting coating to a second thickness that is less than the first thickness.

18. The method as recited in claim 16, further comprising selecting a radially outer surface on each of a first transfer housing and a second transfer housing that abuts a corresponding radial face surface of one of the first side housing and the second side housing and applying the anti-fretting coating to the radially outer surface.

19. The method as recited in claim 18, wherein each of the first transfer housing and the second transfer housing include a radially inner surface and the method includes the step of applying the anti-fretting coating to the radially inner surface.

20. The method as recited in claim 16, wherein the anti-fretting coating comprises one of a chromium carbide, an aluminum bronze, or a tungsten carbide.

* * * * *